(12) United States Patent
Kageyama

(10) Patent No.: US 7,926,990 B2
(45) Date of Patent: Apr. 19, 2011

(54) STRADDLE TYPE VEHICLE AND TAIL LAMP THEREOF

(75) Inventor: Kouji Kageyama, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 228 days.

(21) Appl. No.: 12/353,087

(22) Filed: Jan. 13, 2009

(65) Prior Publication Data

US 2009/0196056 A1    Aug. 6, 2009

(30) Foreign Application Priority Data

Jan. 18, 2008  (JP) .................................. 2008-009845

(51) Int. Cl.
*B62J 6/00* (2006.01)

(52) U.S. Cl. ......... 362/473; 362/540; 362/541; 362/542

(58) Field of Classification Search .................. 362/473, 362/540–542
See application file for complete search history.

(56) References Cited

U.S. PATENT DOCUMENTS

| 6,053,626 | A  | * | 4/2000  | Zagrodnik et al. ............ 362/473 |
| 7,114,836 | B2 | * | 10/2006 | Sheu et al. ..................... 362/473 |
| 7,281,831 | B2 | * | 10/2007 | Kouchi et al. ................. 362/540 |
| 7,316,490 | B2 | * | 1/2008  | Ohzono ......................... 362/473 |
| 7,585,095 | B1 | * | 9/2009  | Sheriff .......................... 362/473 |
| 2006/0077676 | A1 | | 4/2006 | Ohzono |
| 2007/0230202 | A1 | | 10/2007 | Ohzono |

FOREIGN PATENT DOCUMENTS

EP    1 767 444 A1    3/2007
JP    2007-62546 A    3/2007

OTHER PUBLICATIONS

European Search Report citing references submitted in this Information Disclosure Statement.

* cited by examiner

*Primary Examiner* — Robert May
(74) *Attorney, Agent, or Firm* — Keating & Bennett, LLP

(57) ABSTRACT

According to some embodiments, a tail lamp 103 includes a body portion 103a arranged at a rear portion of a vehicle, and side portions 103b and 103c extending forward from the body portion 103a along both vehicle widthwise side surfaces. In some examples, the side portions 103b and 103c of the tail lamp 103 extend forward beyond rear ends of the flashers 101. The tail lamp 103 includes a light-shielding panel 304 arranged between the light source of the tail lamp 103 and the flashers 101.

15 Claims, 10 Drawing Sheets

STRADDLE TYPE VEHICLE AND TAIL LAMP THEREOF

This application claims priority under 35 U.S.C. §119 to Japanese Patent Applications No. 2008-009845 filed on Jan. 18, 2008, the entire disclosure of which is incorporated herein by reference in its entirety.

BACKGROUND

1. Field of the Invention

The preferred embodiments of the present invention relates, inter alia, to a straddle type vehicle, and, more specifically, to a tail lamp to be attached to a rear portion of the straddle type vehicle separately from flashers.

2. Description of the Related Art

The following description sets forth the inventor's knowledge of related art and problems therein and should not be construed as an admission of knowledge in the prior art.

A tail lamp attached to a rear portion of a straddle type vehicle is disclosed in, for example, Japanese Unexamined Patent Application Publication No. 2007-62546. According to the disclosure, a tail lamp is arranged at a rear portion of a vehicle body cover, and flashers (direction indicators) are arranged at the right and left sides of the vehicle body cover separately from the tail lamp.

In the case of disposing the right and left flashers separately from the tail lamp on the rear portion of the vehicle body cover, the attachment rigidity of the tail lamp may sometimes be deteriorated in order to secure the visibility of the flashers. The inventor conceived to improve the visibility of the right and left flashers while enhancing the attachment rigidity of the tail lamp in the case of disposing the right and left flashers separately from the tail lamp at the rear portion of the vehicle body cover.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a straddle type vehicle equipped with a tail lamp capable of improving visibility of flashers while enhancing attachment rigidity of the tail lamp in the case of disposing the flashers separately from the tail lamp at a rear portion of a vehicle body cover.

Among other potential advantages, some embodiments can provide a tail lamp for a straddle type vehicle capable of improving visibility of flashers while enhancing attachment rigidity of the tail lamp in the case of disposing the flashers separately from the tail lamp at a rear portion of a vehicle body cover.

According to a first aspect of a preferred embodiment of the present invention, a straddle type vehicle is equipped with a tail lamp and flashers at a rear portion of a vehicle. The flashers are provided at both vehicle widthwise sides of a rear portion of the vehicle separately from the tail lamp. The tail lamp includes a body portion arranged at the rear portion of the vehicle, and side portions extending from the body portion forwardly beyond rear ends of the flashers along both vehicle widthwise side surfaces and fixed to a vehicle body. Furthermore, a light-shielding portion is arranged between a light source of the tail lamp and the flashers.

According to the straddle type vehicle as described above, since the tail lamp includes the body portion arranged at the rear portion of the vehicle, and the side portions extending forward from the body portion beyond rear ends of the flashers along both vehicle widthwise side surfaces and fixed to the vehicle body, the attachment rigidity of the tail lamp is enhanced. Furthermore, since the light-shielding portion is arranged between the light source of the tail lamp and the flashers, light irradiated from the tail lamp does not interfere with light from the flasher, so that the good visibility of the flasher is achieved.

According to a second aspect of a preferred embodiment of the present invention, in a tail lamp for a straddle type vehicle, the tail lamp is configured to be attached to a rear portion of the straddle type vehicle separately from flashers. The tail lamp includes a body portion arranged at the rear portion of the vehicle, side portions extending forward from the body portion beyond rear ends of the flashers along both vehicle widthwise side surfaces and fixed to a vehicle body, and a light-shielding portion arranged between a light source of the tail lamp and the flashers.

According to the tail lamp for a straddle type vehicle as described above, the same advantages as mentioned above can be obtained.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Figure 1:
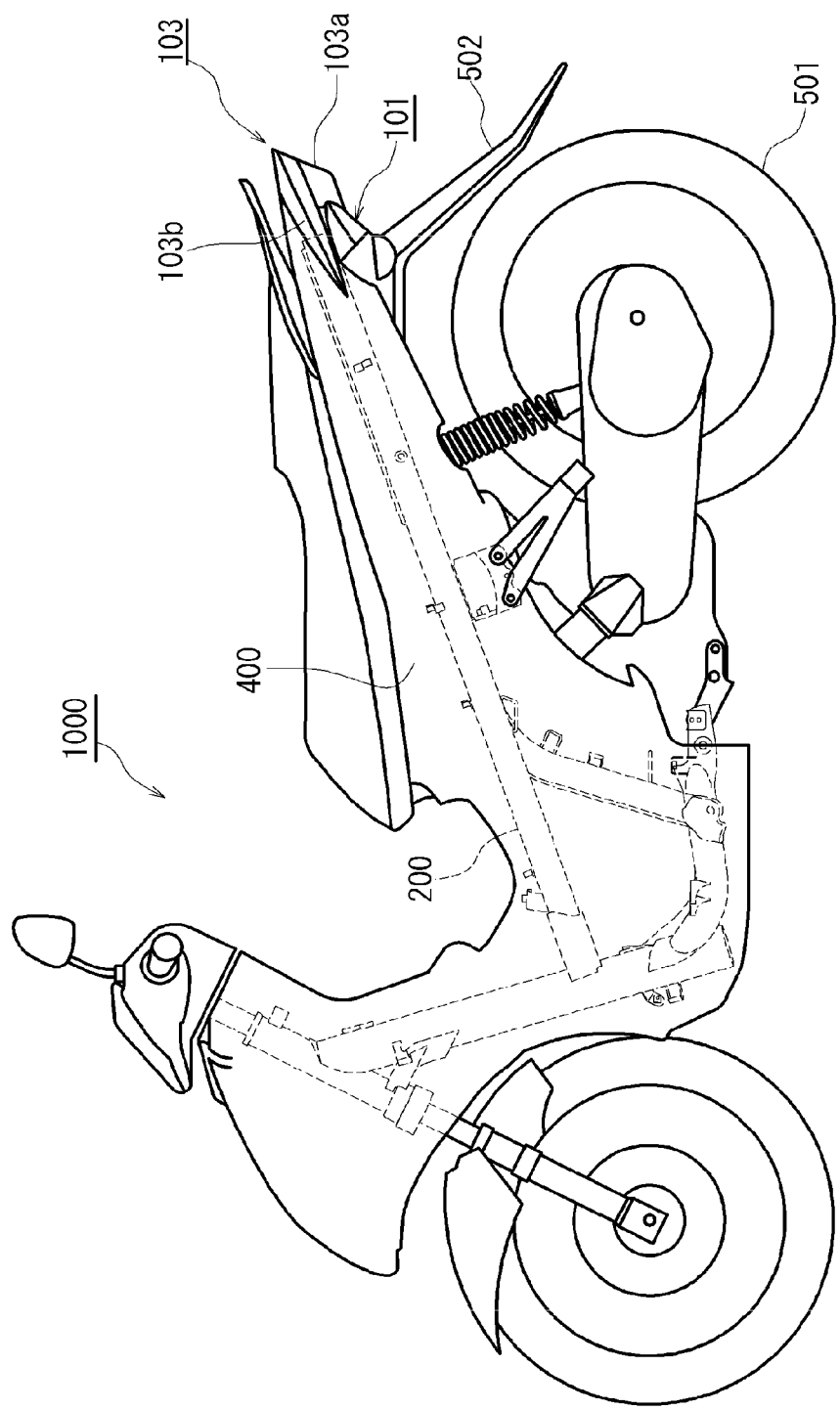
FIG. 1 is a left side view of a straddle type vehicle according to an embodiment of the present invention.

In the following paragraphs, some preferred embodiments of the invention will be described by way of example and not limitation. It should be understood based on this disclosure that various other modifications can be made by those in the art based on these illustrated embodiments.

Referring now to the drawings, a straddle type vehicle according to an embodiment of the present invention will be described. In the drawings, members and portions having the same functions are designated by the same reference numerals in the description. It should be noted that the present invention is not limited to the embodiment shown below. The terms "front", "rear", "left", "right", "upper", and "lower" are based on the directions viewed from a driver when the driver rides on the vehicle in a normal riding position. The front side is indicated as Fr and the rear side is indicated as Rr as needed. The respective drawings are to be viewed in the orientation in which the reference numerals are viewed in the right way.

Figure 2:
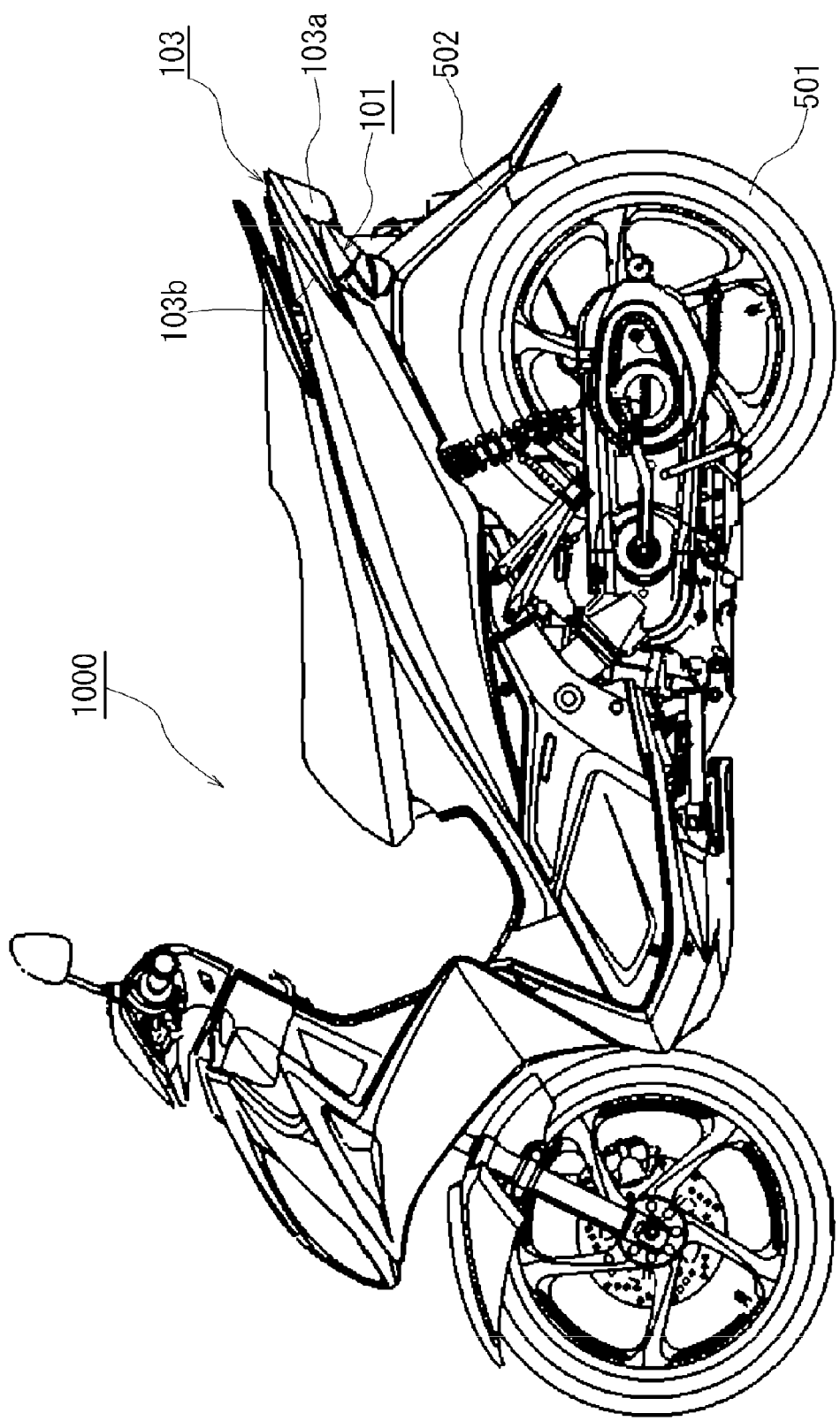
FIG. 2 is a left side view of the straddle type vehicle according to the embodiment of the present invention.

A straddle type vehicle 1000 in this embodiment is, as shown in FIG. 1 and FIG. 2, a scooter type motorcycle, and a vehicle body cover 400 formed of resin is attached to the body frame 200 (see FIG. 1). Mounted on a rear portion of the straddle type vehicle 1000 are a tail lamp 103 which functions mainly as a brake lamp, and flashers 101 which function mainly as direction indicators. In this embodiment, exterior members, such as, e.g., the vehicle body cover 400, the tail lamp 103, and the flashers 101, are attached substantially to the body frame 200 via a bracket (not shown) or the like attached to the body frame 200. Accordingly, the required attachment strength is secured for these exterior members so as not to be rattled due to flowing air or vibrations during travel or the like.

Figure 3:
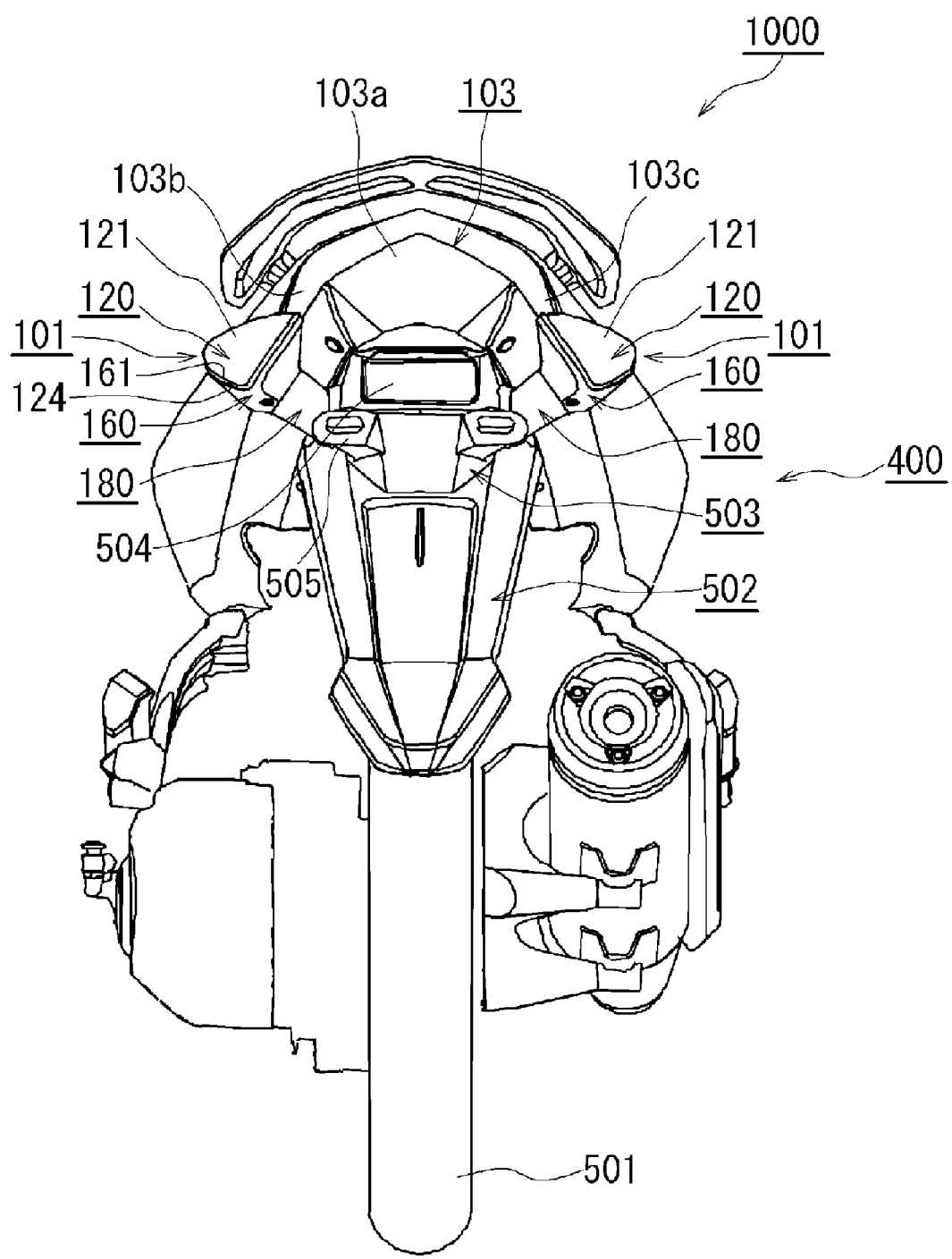
FIG. 3 is a back view of the straddle type vehicle according to the embodiment of the present invention.

The flashers 101 are disposed at both vehicle widthwise sides of the rear portion of the vehicle separately from the tail lamp 103. In this embodiment, as shown in FIG. 3, the flashers 101 each have a leg portion 180, and are disposed at a proximal portion 503 of a mud shield member 502 (rear fender) disposed at a rear side of a rear wheel 501 via the leg portion 180. In the straddle type vehicle 1000, the proximal portion 503 is provided with a reflection panel 504 for reflecting light of following vehicles, and an attachment 505 for mounting a number plate or a license plate.

The flashers 101 each include a lens 120, a cover 160, and the leg portion 180 as shown in FIG. 3. FIG. 3 shows a rear view of the straddle type vehicle 1000 in a partially simplified manner. Specifically, parts in the vehicle body cover 400 are not illustrated.

The lens 120 is a transparent resin (e.g., methacryl-based resin (PMMA) in this embodiment) formed article having a transparent lens surface 121. An outer edge 161 of the cover 160 is fitted on an outer edge 124 of the lens 120. The cover 160 is formed of resin (e.g., Polypropylene (PP) in this embodiment). The leg portion 180 is a cylindrical member, and is formed of rubber in this embodiment. The flasher 101 is configured to illuminate outside the lens 120 through the transparent lens surface 121 of the lens 120. The direction of light from the flasher 101 is adjusted by, e.g., a reflector (not shown) disposed inside the flasher 101 so as to be viewable from a predetermined area outside the flasher 101. As shown in FIG. 3, in this embodiment, the leg portion 180 of each flasher 101 is attached to a position slightly lower than the tail lamp 103 so as to extend widthwise and slightly upward. The leg portion 180 is provided with the cover 160 at a distal end thereof, and the lens 120 is attached to the cover 160 with the lens surface 121 facing rearward and obliquely rearward. Although not shown in the drawing, a light bulb as a light source and a reflector (reflection panel) are disposed in the cover 160. The light bulb is electrically connected to a battery (not shown) of the straddle type vehicle 1000 via electric wiring passed through the interior of the cover 160 and the leg portion 180, then through the vehicle body cover 400. In this embodiment, the flashers 101 emit light from the lens surfaces 121 toward predetermined areas.

Figure 4:
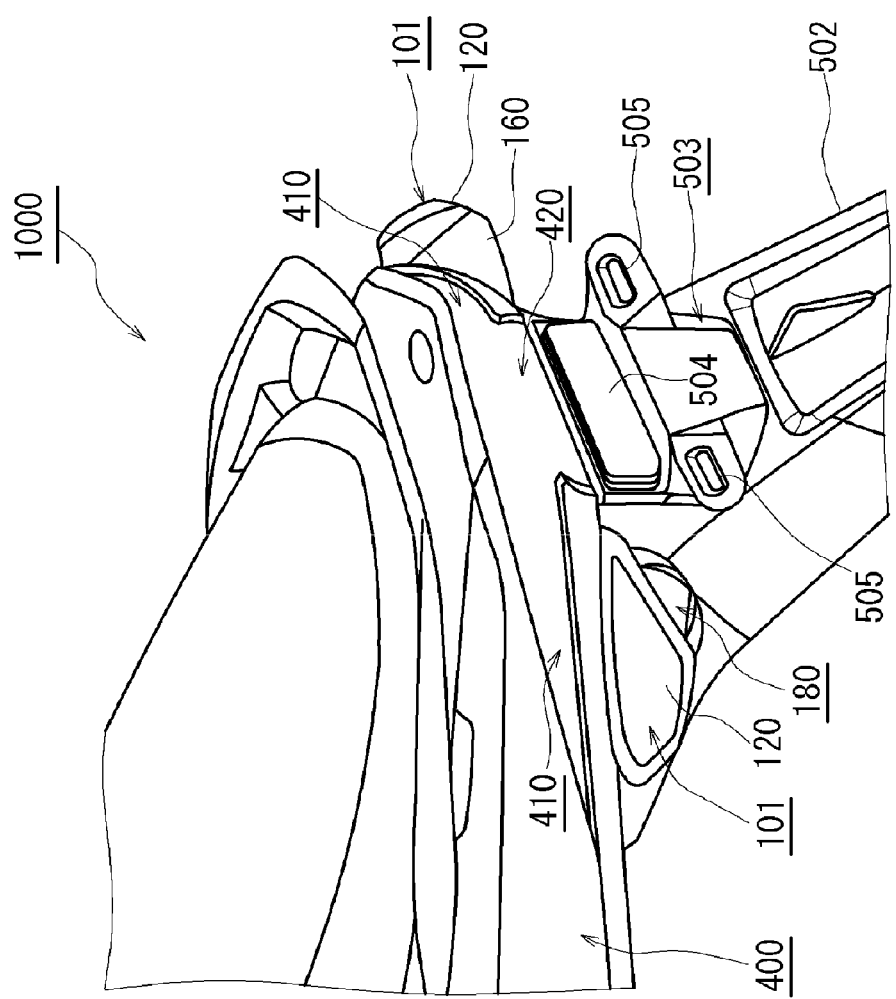
FIG. 4 is a perspective view showing a rear portion of the straddle type vehicle according to the embodiment of the present invention.

The tail lamp 103 is mounted on a rear portion of the vehicle body cover 400 of the straddle type vehicle 1000. In this embodiment, the vehicle body cover 400 includes a mounting portion 420 for mounting the tail lamp 103 on the rear portion of the vehicle as shown in FIG. 4. FIG. 4 shows a state in which the tail lamp 103 is removed from the rear portion of the vehicle body cover 400 of the straddle type vehicle 1000. For the sake of convenience, components in the vehicle body cover 400 of the straddle type vehicle 1000 are not shown in the drawing. The vehicle body cover 400 has notches 410 at both sides of the rear portion of the vehicle so as to divide the vehicle body cover 400 into an upper part and a lower part in the mounting portion 420.

Figure 5:
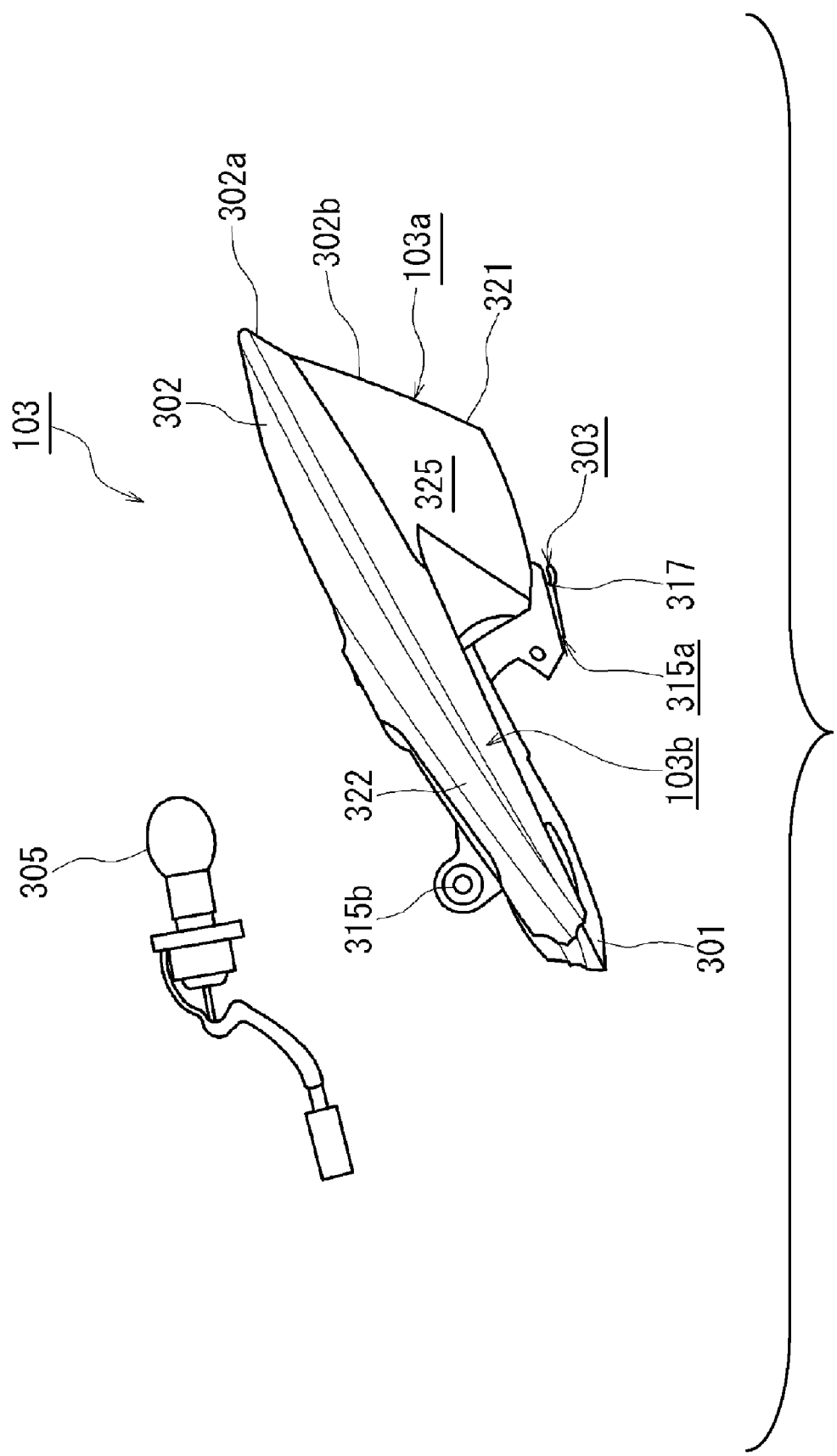
FIG. 5 is a side view of a tail lamp according to the embodiment of the present invention.
Figure 6:
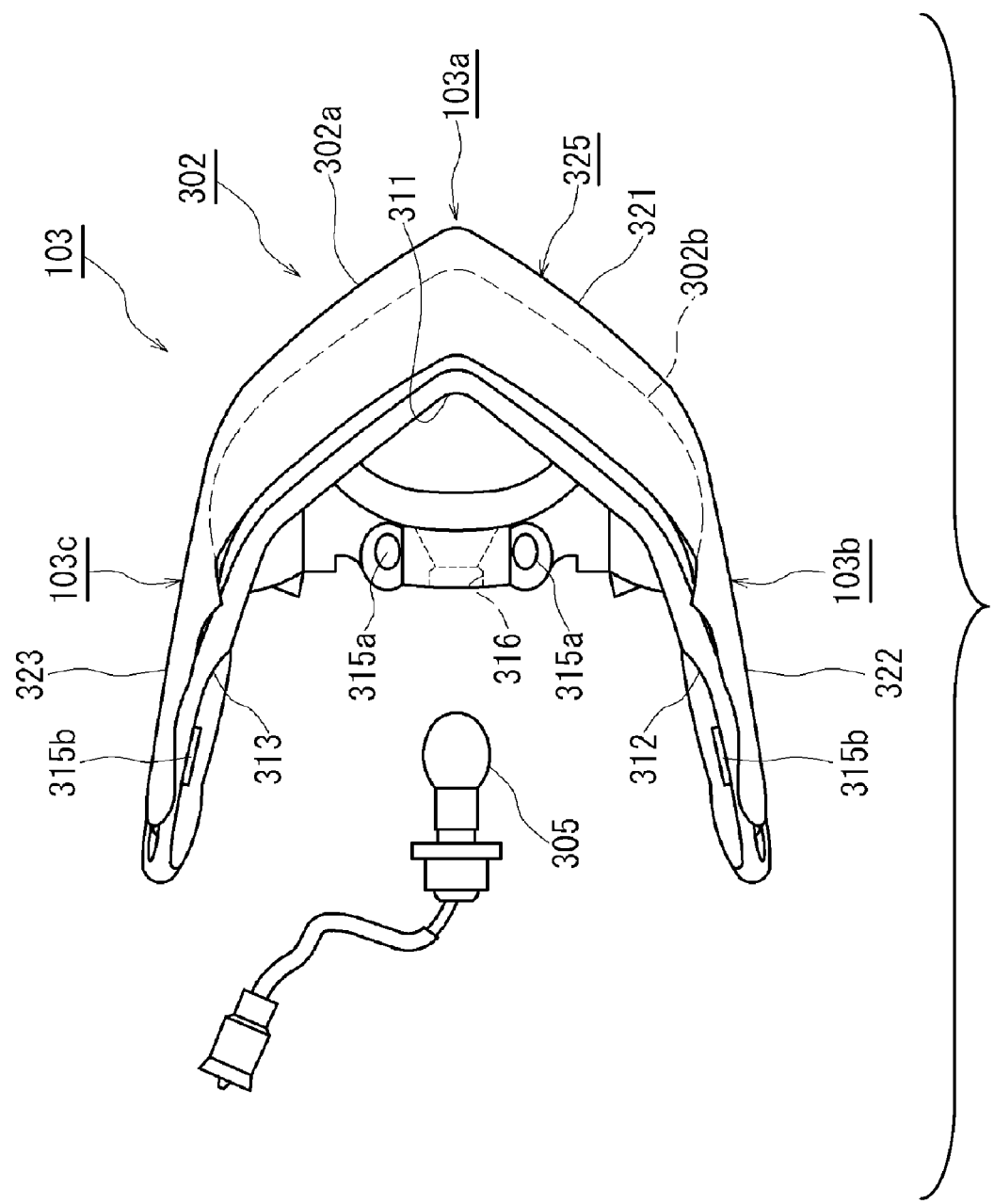
FIG. 6 is a plan view of the tail lamp according to the embodiment of the present invention.

As shown in FIG. 5 and FIG. 6, the tail lamp 103 includes a body portion 103a to be arranged at the rear portion of the vehicle, and side portions 103b and 103c extending from the body portion 103a toward the front side along both vehicle widthwise side surfaces. In this embodiment, as shown in FIG. 1, the side portions 103b and 103c of the tail lamp 103 extend forward beyond the rear ends of the flashers 101. The tail lamp 103 includes a light-shielding portion 304 (see FIG. 9) arranged between the light source of the tail lamp 103 and the flashers 101.

Figure 7:
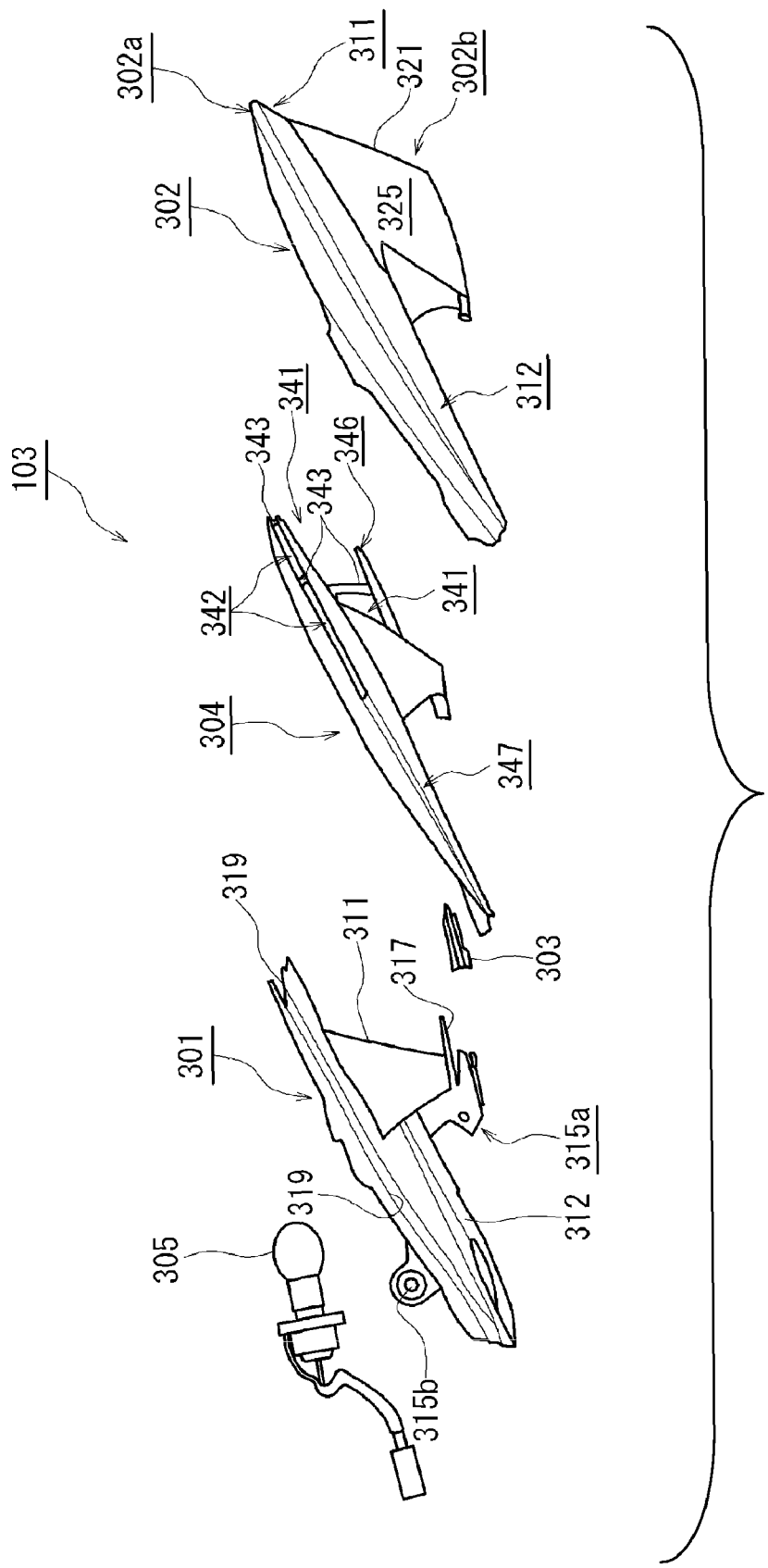
FIG. 7 is an exploded side view of the tail lamp according to the embodiment of the present invention.
Figure 8:
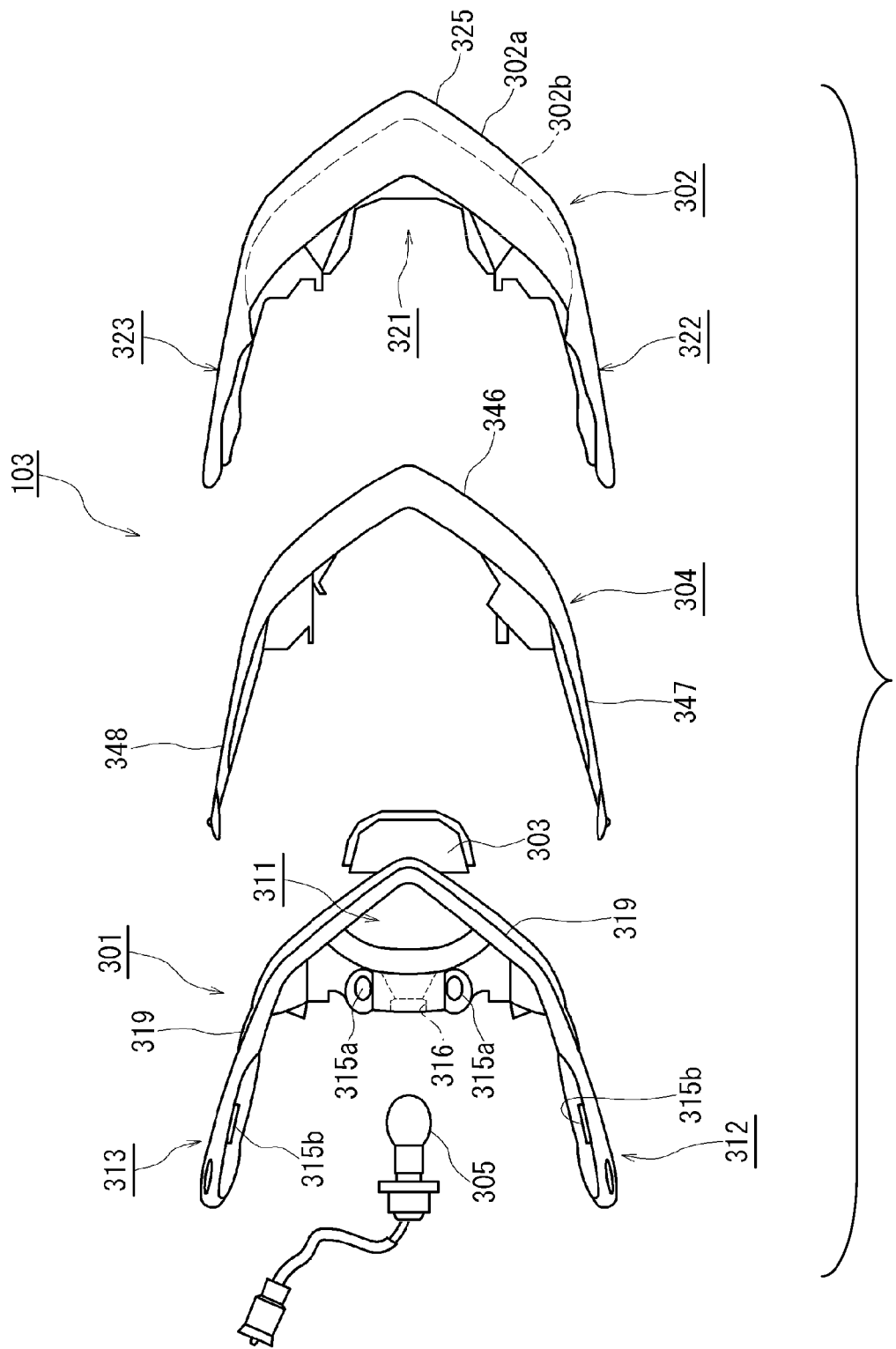
FIG. 8 is an exploded plan view of the tail lamp according to the embodiment of the present invention.

More specifically, the tail lamp 103 includes a housing 301, a first lens 302, a second lens 303, the light-shielding panel 304 as the light-shielding portion, and a light bulb 305 as the light source as shown in FIG. 7 and FIG. 8.

The housing 301 is formed of resin (e.g., polypropylene (PP) in this embodiment) and, as shown in FIG. 7 and FIG. 8, includes a base portion 311 disposed on the rear portion of the vehicle body, and side portions 312 and 313 extending from the base portion 311 at both vehicle widthwise sides. The base portion 311 is provided with a light bulb attachment 316 for attaching the light bulb 305. The base portion 311 and the side portions 312 and 313 are fixed to the vehicle body respectively. In this embodiment, fixing portions 315a and 315b to be fixed to the vehicle body respectively are provided at the inner side portion of the base portion 311 (inside when being mounted on the vehicle body cover 400) and upper portions of the side portions 312 and 313. As shown in FIG. 6, the light bulb attachment 316 for attaching the light bulb 305 is provided at the center of the base portion 311. In this embodiment, the inside of the housing 301 is mirror-finished by aluminum-deposition so as to function as a reflector. As shown FIG. 7, a second lens disposing portion 317 for disposing a second lens 303 is provided at the lower side of the base portion 311. In this embodiment, the housing 301 is equipped with the fixing portions 315a and 315b respectively on the base portion 311 and the side portions 312 and 313 as shown in FIG. 5, and fixed to the vehicle body cover 400 by the fixing portions 315a and 315b. In this embodiment, as shown in FIG. 7 and FIG. 8, a first lens attaching portion 319 for attaching the first lens 302 is provided at the outside of the base portion 311 and the side portions 312 and 313 of the housing 301.

The first lens 302 is formed of transparent resin (e.g., methacryl-based resin (PMMA) in this embodiment). The first lens 302 is aligned with the outside (outside when being mounted to the vehicle body cover 400) of the base portion 311 and the side portions 312 and 313 of the housing 301, and constitutes a lense surface 325 of the tail lamp 103 as shown in FIG. 5 and FIG. 6. In this embodiment, as shown in FIG. 6 and FIG. 8, an upper portion 302a of the first lens 302 is protruded outward with respect to a lower portion 302b as seen from the top. Portions 322 and 323 corresponding to the side portions 103b and 103c of the tail lamp 103 are fitted to the notches 410 (see FIG. 4) formed at both sides of the rear portion of the vehicle body cover 400.

The second lens 303 is formed of transparent resin (e.g., methacryl-based resin (PMMA)) and fitted to the lower portion of the housing 301. In this embodiment, as shown in FIG. 3 and FIG. 4, the straddle type vehicle 1000 has a number plate (license plate) at the lower side of the tail lamp 103. As shown in FIG. 5 and FIG. 7, the second lens 303 is arranged at the lower portion of the tail lamp 103 for illuminating the number plate (license plate) by the light from the tail lamp 103.

Figure 9:
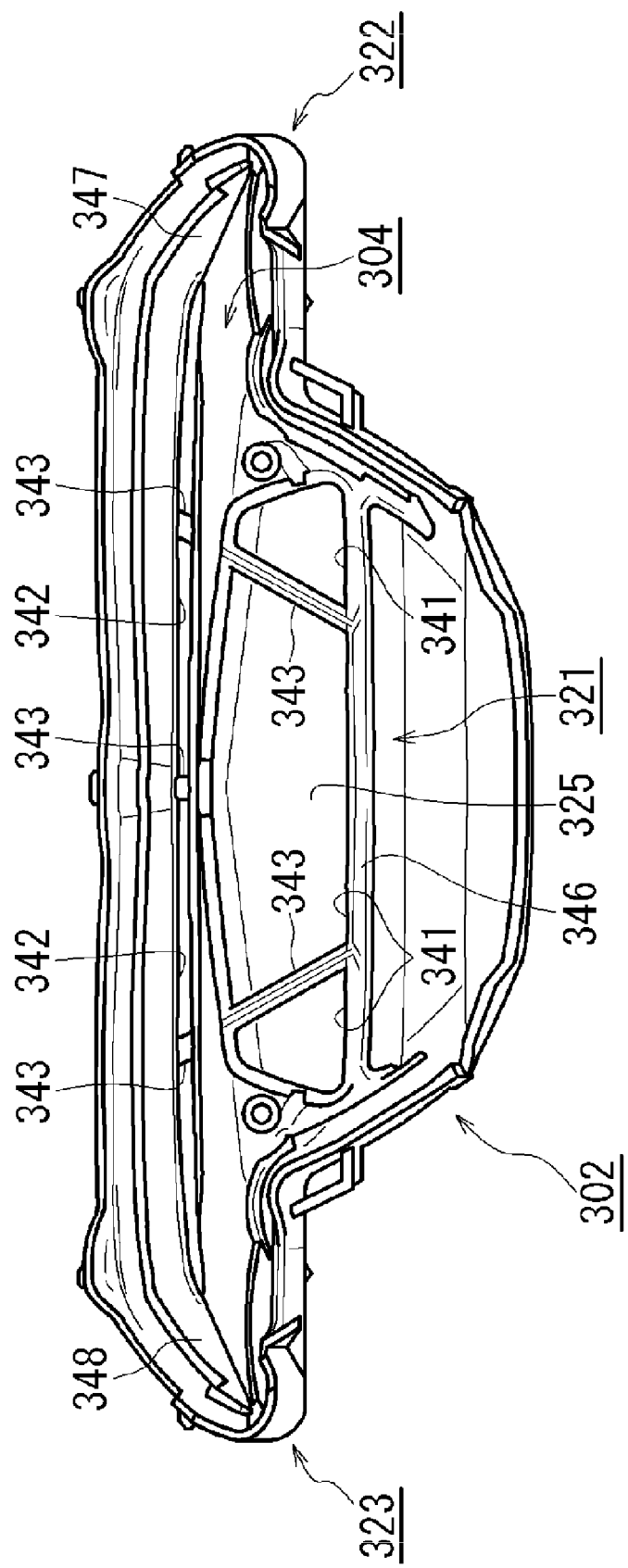
FIG. 9 shows a state in which a light-shielding panel is fitted to a lens of the tail lamp according to the embodiment of the present invention.

The light-shielding panel 304 is configured to limit the irradiation range of the tail lamp 103. In this tail lamp 103, the light-shielding panel 304 is arranged between the light bulb 305 (light source) of the tail lamp 103 and the flashers 101. The light-shielding panel 304 is formed of resin (e.g., polycarbonate (PC) in this embodiment), and the surface thereof is mirror-finished by aluminum deposition. The light-shielding portion 304 is disposed inside the first lens 302 and, more specifically, fitted to the inner surface of the first lens 302 as shown in FIG. 9. In this embodiment, the light-shielding panel 304 is formed of a plate member extending continuously from both right and left side portions 103b and 103c of the tail lamp 103, and has an opening 341 and slits 342 (openings) for allowing passage of light of the light bulb 305 (light source) at the rear portion of the tail lamp 103. In this embodiment, as shown in FIG. 8 and FIG. 9, the light-shielding panel 304 includes a base portion 346 corresponding to the base portion 321 of the first lens 302 and side portions 347 and 348 corresponding to the side portions 322 and 323 of the first lens 302 respectively, and the opening 341 and the slits 342 are formed at given positions.

The side portions 347 and 348 of the light-shielding panel 304 extend between the light bulb 305 (light source) and the flashers 101 at both left and right side portions 103b and 103c of the tail lamp 103. Both the side portions 347 and 348 of the light-shielding panel 304 continue via the base portion 346. As shown in FIG. 7 and FIG. 8, the light-shielding panel 304 is provided with the opening 341 and the slits 342 for allowing passage of the light from the light bulb 305 at portions, such as, e.g., the rear portion of the tail lamp 103, to be lightened up. Beams 343 are provided for securing the strength adequately.

The tail lamp 103 is assembled, as shown in FIG. 6, by fitting the housing 301, the first lens 302, the second lens 303, and the light-shielding panel 304 with each other, and the light bulb 305 is attached to the light bulb attachment 316 of the housing 301. Then, the assembled tail lamp 103 is attached as shown in FIG. 3. In detail, the body portion 103a of the tail lamp 103 is attached to the mounting portion 420 (see FIG. 4) surrounded by the vehicle body cover 400 on the rear portion of the straddle type vehicle 1000 in a state in which the side portions 103b and 103c of the tail lamp 103 are fitted in the notches 410 which divide the vehicle body cover 400 into the upper part and the lower part at both sides of the rear portion of the vehicle (see FIG. 3).

As shown in FIG. 3, in the straddle type vehicle 1000, the flashers 101 are formed separately from the tail lamp 103 and disposed at both vehicle widthwise sides of the vehicle rear portion. In the straddle type vehicle 1000, the tail lamp 103 extends forwardly from the body portion 103a arranged at the vehicle rear portion beyond the rear ends of the flashers 101 along both vehicle side surfaces (see FIG. 1), and the side portions 103b and 103c are fixed to the vehicle body. Therefore, the tail lamp 103 is fixed not only to the rear portion of the vehicle, but also to both side portions of the vehicle, and hence high attachment rigidity is achieved. Also, the light-shielding panel 304 (light-shielding portion) is arranged between the light bulb 305 of the tail lamp 103 (see FIG. 6) and the flashers 101 (see FIG. 3). Therefore, the light irradiated from the tail lamp 103 does not interfere with the light from the flashers 101, so that the good visibility of the flashers 101 is achieved. In this embodiment, the tail lamp 103 (the first lens 302) is formed into a generally arch shape as a whole in plan view, which enables adequate releasing of possible application of external force. Therefore, the tail lamp is hardly broken in case of, e.g., falling.

In this embodiment, the housing 301 of the tail lamp 103 includes the base portion 311 disposed at the rear portion of the vehicle body and the side portions 312, 313 extending from the base portion 311 along both vehicle widthwise sides. Both the base portion 311 and the side portions 312, 313 are fixed to the vehicle body, and therefore higher attachment strength is achieved.

In this embodiment, as shown in FIG. 9, the light-shielding panel 304 is disposed inside the first lens 302 of the tail lamp 103. In this embodiment, the light-shielding panel 304 is fitted to the inner surface of the first lens 302. In this structure, the first lens 302 forming the external shape of the tail lamp 103 is reinforced by the light-shielding panel 304 fitted to the inner surface, and therefore it is hardly broken.

In this embodiment, the light-shielding panel 304 is formed by a plate member extending continuously along both right and left side portions 103b and 103c of the tail lamp 103, and is provided with openings 341 and 342 for allowing passage of light of the light bulb 305 (light source) at the rear portion of the tail lamp 103. In this configuration, the light-shielding panel 304 can be formed by a single member, which in turn can reduce the number of components and the number of assembling steps as well.

It can be configured such that the light-shielding panel 304 is fitted to the inner surface of the first lens 302 so as to partly support the inside of the first lens 302. In this embodiment, as explained above, the light-shielding panel 304 is formed by a single member extending along both side portions 347 and 348, and that it has an arch shape extending along the inner surface of the first lens 302. Therefore, even if the light-shielding panel 304 is formed by a thin plate member, the strength required for reinforcing the first lens 302 is realized.

As explained above, the vehicle body cover 400 of the straddle type vehicle 1000 is provided with the notches 410 dividing the vehicle body cover 400 into the upper part and the lower part at both sides of the rear portion, and the first lens 302 is fitted in the notches 410. This structure can improve the attachment accuracy and the attachment rigidity of the tail lamp 103, and enables fitting of the peripheral edges of the first lens 302 to the edge of the notches 410 of the vehicle body cover 400. In this case, since the first lens 302 is protected also by the vehicle body cover 400, it can hardly be broken.

The above explanation was directed to a straddle type vehicle according to an embodiment of the present invention. It should be noted, however, that a straddle type vehicle according to the present invention is not limited to the aforementioned embodiment, and allows various modifications thereof.

Figure 10:
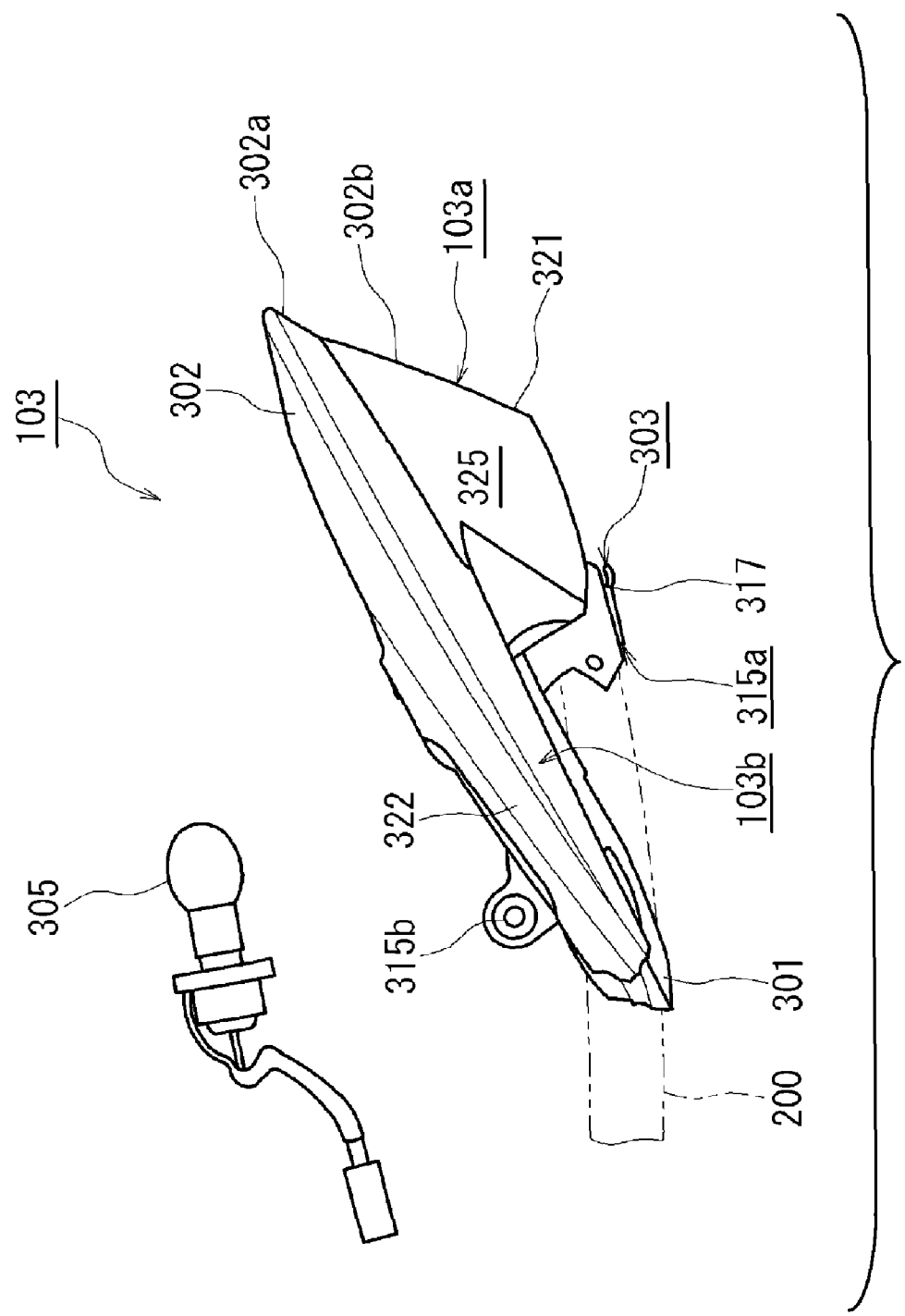
FIG. 10 is a side view showing an attachment structure of the tail lamp according to another embodiment of the present invention.

The tail lamp is not limited to the structure exemplified in the embodiment shown above. For example, in the embodiment described above, the housing 301 of the tail lamp 103 is fixed to the vehicle body cover 400. However, the housing 301 can be fixed to the body frame 200 as shown in FIG. 10. In this case, fixation of the housing 301 can achieved by fixing one of the base portion 311 and the side portions 312 and 313 (see FIG. 8) to the upper side of the body frame 200 and the other one to the lower side of the body frame 200. More specifically, the fixing portion 315a provided at the base portion 311 is fixed to the lower side of the rear portion of the body frame 200, and the fixing portion 315b provided at the side portions 312, 313 is fixed to the upper side of the rear portion of the body frame 200. In this case, the housing 301 can be attached substantially to the body frame 200 via a bracket attached to the body frame 200. In this manner, by sandwiching the rear portion of the body frame 200 by and between the base portion 311 and the side portions 312 and 313 from above and below, the rigidity of the tail lamp 103 can be further improved.

For example, a light bulb is exemplified as the light source, but the light source is not limited to a light bulb, and a component having a function to emit light, such as, e.g., a light-emitting element (for example, an LED) can be used. The specific structures of the lens, the housing, and the light-shielding panel are not limited to those in the aforementioned embodiment. For example, although the light-shielding panel is exemplified as a light-shielding portion arranged between the light source of the tail lamp and the flashers, the light-shielding portion merely requires a light shielding function, and is not necessarily configured by a panel member. For example, the light-shielding portion can be configured by a seal to be adhered to the inside of the lens. It can be formed by coating a portion to shield light inside the lens with an opaque coating material. Although the structure in which the notches dividing the vehicle body cover into the upper part and the lower part are formed at both side portions of the rear portion of the straddle type vehicle and the lens of the tail lamp is fitted to the notches is exemplified, the notches can be eliminated from the vehicle body cover and the lens of the tail lamp cannot be fitted to the notches.

In the above embodiment, an example of an embodiment of the present invention is explained in which as an example, the straddle-type vehicle 1000 is a scooter type. However, the straddle-type vehicle of the present invention is not limited to this illustrative type of motorcycle 1000. The straddle-type vehicle of the present invention can include, e.g., any type of motorcycle or off-road vehicle, such as, e.g., a street motorcycle, an off-road motorcycle, a moped, a three, four or more wheeled vehicle, such as, e.g., an All Terrain Vehicle (ATV) or the like.

In this application, the language "motorcycle" is to be construed broadly and encompasses various motorized vehicles that are ridden by one or more rider, including, e.g., motorbikes, scooters, mopeds and other similar vehicles, which can include two wheeled vehicles and vehicles having more than two wheels.

In this application, the language "straddle type vehicle" includes, for example, motorcycles, snow mobiles, all terrain vehicles (ATVs), four-wheeled buggies, etc., which often involve vehicles that can be turned, tilted or otherwise affected by the driver's weight position. The terminology straddle type vehicle is not limited to vehicles in which a driver and/or passenger sits with legs straddling on opposite sides of a portion of the vehicle (such as, e.g., straddling a seat), but also includes vehicles in which a driver and/or passenger's legs can extend across a substantial portion of the width of the passenger-supporting portion of the vehicle, such that, by way of example, while a driver may sit with legs forward in a scooter, a scooter is understood to be a straddle type vehicle due to the ability of a driver and/or passenger to extend their legs across a substantial portion of the width of the passenger-supporting portion. In this manner, the driver of a straddle type vehicle is typically able to distribute their weight widthwise across the vehicle and to turn, tilt or otherwise influence the vehicle by the driver's weight position.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A straddle type vehicle comprising:
   a tail lamp; and flashers at a rear portion of the vehicle; wherein
the flashers are provided at both vehicle widthwise sides of a rear portion of the vehicle separately from the tail lamp; and
the tail lamp includes:
a body portion arranged at the rear portion of the vehicle;
side portions extending forward from the body portion beyond rear ends of the flashers along both vehicle widthwise side surfaces and fixed to a vehicle body;
a light-shielding portion arranged between a light source of the tail lamp and the flashers; and
a housing having the light source disposed therein and a lens fitted to the housing; wherein
the housing includes a base portion disposed at the rear portion of the vehicle body, and side portions extending from the base portion at both vehicle widthwise sides, and the base portion and the side portions being fixed to the vehicle body.

2. The straddle type vehicle as recited in claim 1, wherein one of the base portion and the side portions of the housing is fixed to an upper side of a body frame and the other one of those is fixed to a lower side of the body frame.

3. The straddle type vehicle as recited in claim 1, wherein the light-shielding portion is a light-shielding panel disposed inside the lens.

4. The straddle type vehicle as recited in claim 3, wherein the light-shielding panel is fitted to an inner surface of the lens.

5. The straddle type vehicle as recited in claim 3, wherein the light-shielding panel is formed by a panel member extending continuously to both left and right side portions of the tail lamp, and has an opening for allowing passage of light from the light source at a rear portion of the tail lamp.

6. The straddle type vehicle as recited in claim 1, wherein a vehicle body cover of the straddle type vehicle is provided with notches dividing the vehicle body cover into an upper part and a lower part at both sides of a rear portion, and the lens is fitted to the notches.

7. The straddle type vehicle as recited in claim 1, wherein the tail lamp is formed into a generally arch shape as a whole in plan view.

8. The straddle type vehicle as recited in claim 1,
wherein the housing includes a second lens,
wherein the lens is aligned with an outside of the base portion and the side portions of the housing, and constitutes a lens surface of the tail lamp, and
wherein the second lens is fitted to a lower portion of the housing so as to illuminate a number plate or a license plate by the light source of the tail lamp.

9. A tail lamp for a straddle type vehicle and configured to be attached to a rear portion of the straddle type vehicle separately from flashers, the tail lamp comprising:
a body portion arranged at the rear portion of the vehicle;
side portions extending forward from the body portion beyond rear ends of the flashers along both vehicle widthwise side surfaces and fixed to a vehicle body;
a light-shielding portion arranged between a light source of the tail lamp and the flashers; and
a housing having the light source disposed therein and a lens fitted to the housing; wherein
the housing includes a base portion disposed at the rear portion of the vehicle body, and side portions extending from the base portion at both vehicle widthwise sides, and the base portion and the side portions being fixed to the vehicle body.

10. The tail lamp for a straddle type vehicle as recited in claim 9, wherein one of the base portion and the side portions of the housing is fixed to an upper side of a body frame and the other one of those is fixed to a lower side of the body frame.

11. The tail lamp for a straddle type vehicle as recited in claim 9, wherein the light-shielding portion is a light-shielding panel disposed inside the lens.

12. The tail lamp for a straddle type vehicle as recited in claim 11, wherein the light-shielding panel is fitted to an inner surface of the lens.

13. The tail lamp for a straddle type vehicle as recited in claim 11, wherein the light-shielding panel is formed by a panel member extending continuously to both left and right side portions of the tail lamp, and has an opening for allowing passage of light from the light source at a rear portion of the tail lamp.

14. The tail lamp for a straddle type vehicle as recited in claim 9, wherein a vehicle body cover of the straddle type vehicle is provided with notches dividing the vehicle body cover into an upper part and a lower part at both sides of a rear portion, and the lens is fitted into the notches.

15. The tail lamp for a straddle type vehicle as recited in claim 9, wherein the tail lamp is formed into a generally arch shape as a whole in plan view.

* * * * *